Figure 1:
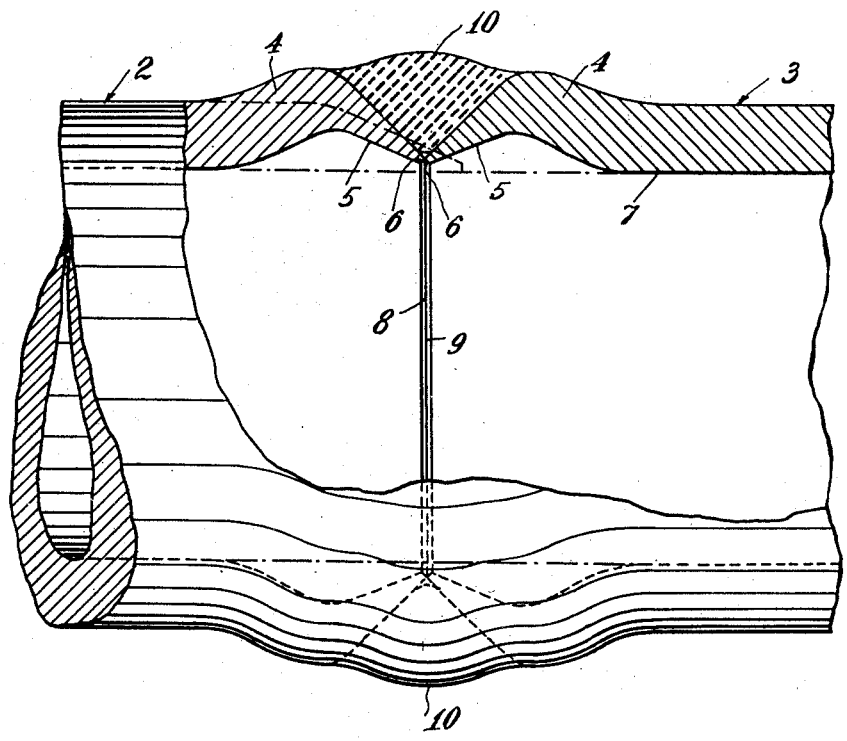

May 26, 1936.                     C. M. HOUSTON                     2,042,100
        METHOD OF PREPARING THE ENDS OF TUBULAR MEMBERS FOR A WELDED JOINT
                                Filed Nov. 4, 1935

Claude M. Houston
INVENTOR.

BY Ralph Donath
ATTORNEY

Patented May 26, 1936

2,042,100

UNITED STATES PATENT OFFICE 2,042,100

METHOD OF PREPARING THE ENDS OF TUBULAR MEMBERS FOR A WELDED JOINT

Claude M. Houston, Pittsburgh, Pa.

Application November 4, 1935, Serial No. 48,198

4 Claims. (Cl. 113—112)

This invention relates to methods of welding together the ends of tubular members.

One of the objects of the invention is to provide a solid base when welding against which to deposit the welding metal, without having recourse to employing back-up strips or welding rings therewith.

Another object of the invention is to provide a degree of easy plastic adjustment of the edges in contact, as the layer of weld is being applied.

A further object of the invention is to so process the abutting tubular ends that a welding groove is formed by the end edges in contact with each other, the welding groove so formed being of such shape and disposition with respect to the parent metal walls of the tubes, that the deposited weld volume of metal is not only substantially thicker than the normal tube wall but also extends as a homogeneous solid, both above and below the upper and lower surface elements of the effective walls of the tube contiguous to the weld area.

Still another object of the invention is to provide a welded joint for tubes or pipes which results in a compressive or lesser tensile stress at the inner edge zone of the completed welded joint, in contradistinction to a greater tensile stress in the deposited metal in the outer zone of the weld when the completed welded tubular joint is subjected to tensile stress in a longitudinal direction axially of the tubes.

Still another object of the invention is to produce a strong and easy weldable joint, even though the perimeters of the abutting end edges of the pipes do not accurately match when butted end to end at the beginning of the welding operation.

Yet another object of the invention is to provide a maximum throat opening in the pipe line at the welded joint, which is equal or greater in area than the nominal sectional area of the pipe line interior.

Further objects of the invention are to provide a welded joint which is strong, durable and inexpensive to apply.

To the accomplishment of these and such other objects as may hereafter appear the invention consists of the novel method of preparing the abutment ends of tubular members for welding herein specifically described and illustrated in the accompanying drawing, wherein is shown an embodiment of the invention, but it is to be understood that changes, variations and modifications may be resorted to which come within the scope of the claims hereunto appended.

In the accompanying drawing forming a part of this application, and in which similar reference symbols indicate corresponding parts:

The figure is a fragmentary sectional view illustrating the principles of the details of the construction of the welded pipes in welded condition.

In the illustrated embodiment of the invention, each of the tubular members 2 and 3, which may be of any suitable size, is provided with an outwardly flared portion 4 which diminishes gradually and is turned inwardly as indicated by the numeral 5 in such manner that the stubbed end edge 6 thereof is substantially outside of the tube interior 7 as indicated by the dot and dash lines. The so formed pipe ends 8 and 9 are then placed in abutment and welded together by well known means so that the deposited fusible metal, when completed, forms a V or U shaped welded joint 10, as shown.

I claim:

1. The method of welding pipes end to end, which consists in bevelling the ends of the pipes to be joined, imparting to each bevelled end an outwardly directed concavo-convex bulge, turning the bevelled edges inwardly, juxtaposing the so formed pipe ends and depositing welding metal circumferentially in the space defined by the bevelled ends.

2. The method of welding pipes end to end, which consists in outwardly bevelling the ends of the pipes to be joined, imparting to each bevelled end an outwardly directed concavo-convex bulge, turning the bevelled edges inwardly, juxtaposing the so formed pipe ends and depositing welding metal circumferentially in the space defined by the bevelled ends.

3. The method of welding pipes end to end, which consists in bevelling the ends of the pipes to be joined, imparting to each bevelled end an outwardly directed concavo-convex bulge, turning the bevelled edges inwardly to a diameter greater than the normal inside diameter of said pipes, juxtaposing the so formed pipe-ends and depositing welding metal circumferentially in the space defined by the bevelled ends.

4. The method of welding pipes end to end, which consists in bevelling the ends of the pipes to be joined, imparting to each bevelled end and outwardly directed concavo-convex bulge, turning the bevelled ends inwardly and obliquely to the axis of the pipes to a diameter greater than the normal bore of said pipes, juxtaposing the so formed pipe ends and depositing welding material circumferentially in the space defined by the bevelled ends.

CLAUDE M. HOUSTON.